Oct. 11, 1932. J. M. HARGRAVE 1,881,535
DRILL
Filed Nov. 23, 1931
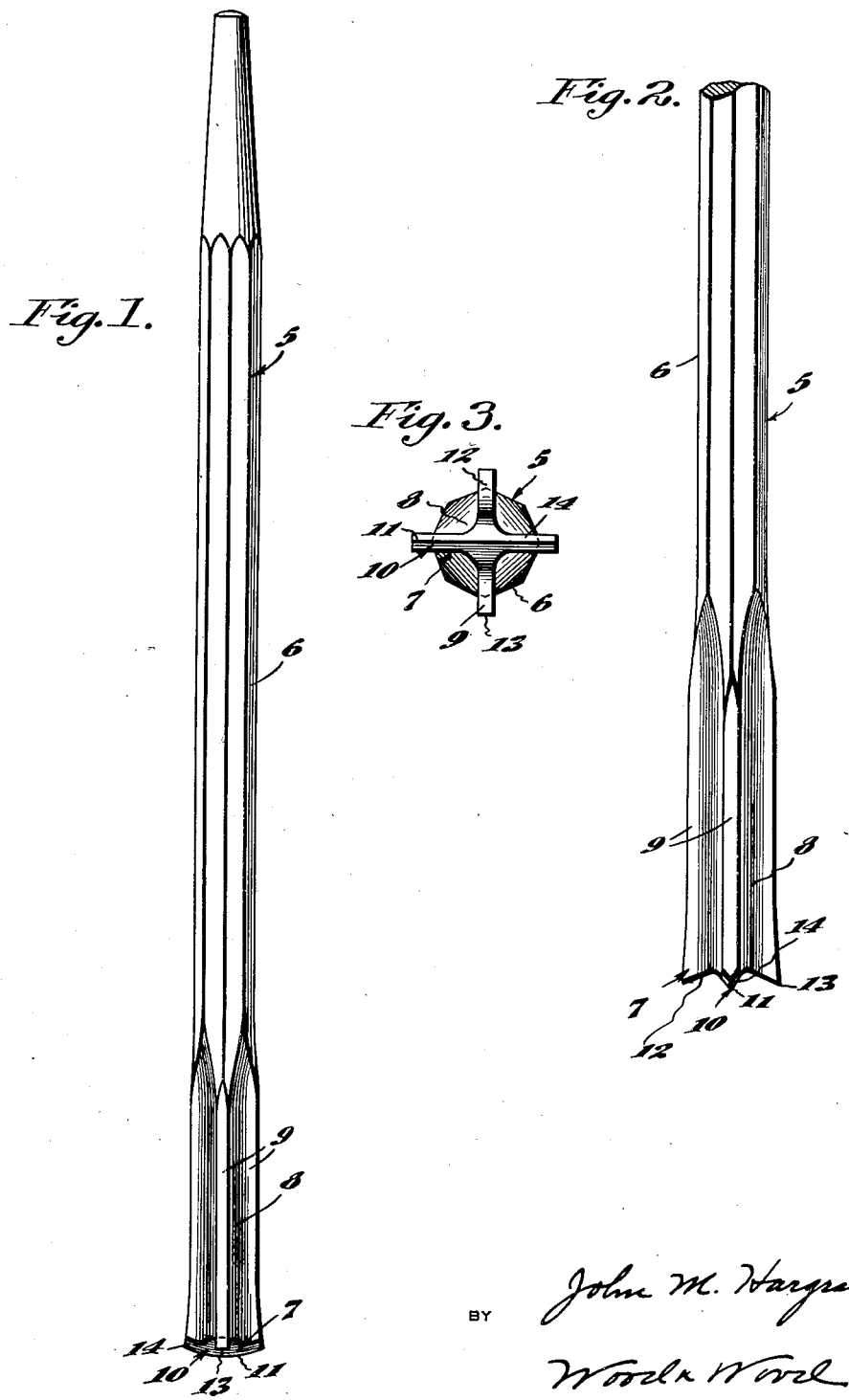
INVENTOR
John M. Hargrave
BY
Woodx Wood
ATTORNEYS Patented Oct. 11, 1932

1,881,535

UNITED STATES PATENT OFFICE

JOHN M. HARGRAVE, OF CINCINNATI, OHIO

DRILL

Application filed November 23, 1931. Serial No. 576,751.

This invention relates to drills and is particularly directed to improvements in that type of drill used for drilling rock, concrete, etc.

It is an object of this invention to provide a rock drill having an improved arrangement of cutting edges accomplishing a more rapid drilling operation, drilling an extremely regular and smooth walled hole and in which the sharpness of the cutting edges is preserved over an extremely long period of time.

It is a further object of this invention to provide an improved drill in which the cutting edges may be sharpened by a simple grinding operation presenting a minimum number of edges for sharpening and having the edges arranged for sharpening by a conventional device such as a standard grinding wheel.

Other objects and certain advantages will be more fully apparent from a description of the accompanying drawing, in which:

Figure 1 is a side view of the improved drill.

Figure 2 is also a side view, taken at right angles to Figure 1.

Figure 3 is an end view of the drill illustrating the arrangement of the cutting edges.

Referring to the drawing, the drill is generally indicated at 5 and comprises a shank 6 having an enlarged cutting end 7. The enlarged end of the drill is grooved as at 8 to provide diametrically related radially extended flutes 9, the outer edges of these flutes at the end of the drill defining the size of the drill. In the present instance there are four flutes, these being sufficient for centering the drill in the hole.

More specifically described, the operative end of the drilling tool may be said to comprise a chisel blade 10 providing a diametrically disposed line cutting edge 11 and centering flutes extending from either side centrally of said chisel blade, the full width of the blade and the combined width of the flutes being equal for accurately centering the device in the hole being drilled. The respective outer edges of the flutes and chisel blade are flared from the shank of the tool to provide the necessary clearance along the flutes and blade back to the shank of the tool.

The cross webs or flutes 9 of the tool, besides functioning for centering purposes, further function to provide cutting edges. For this purpose the ends 12 of the flutes or webs are ground to extend angularly toward the shank of the tool for joining the sides 13 of the chisel blade at approximately right angles. This provides sharpened cutting edges 14 at the juncture of the sides of the flutes with the end surfaces thereof, these cutting edges being parallel with the cutting edge of the chisel and operating to cut down the sides of the aperture being drilled, it being understood of course that the tool is rotated after each blow is delivered thereto. The main or line cutting edge 11 of the tool of the chisel portion is preferably rounded and has its medial portion disposed beyond the shearing edges of the side flutes or webs.

It has been found that the described construction affords a distinct improvement in this type of tool in that the drilling operation is more rapid and the drill hole is more uniform and regularly cut. In view of the fact that the chisel is rounded, the medial portion provides an advance cut. The effect of hammer blows on the drill at successive slightly advancing rotative positions is to cause a slicing cut, this slicing cut being the full diameter of the hole and taking place in diametric lines rotatably progressing. Since the cutting edge operates on a diametric line in the bottom of the hole and advances a few degress of rotation for each impact, the effect is to cut away successive portions of the stone or concrete, there being no interference with the shearing away of the material in the bottom of the hole as would be the case where a series of diametrically disposed cutting edges are provided.

There is ample clearance at each side of the single diametric edge for the displacement of the material being cut, this material feeding upwardly through the grooved sides of the tool between the flutes and being readily discharged therefrom. It is for this reason of clearance that the chisel blade sides 13 are extended well away from the actual cutting line and the angle of juncture with the inclined ends 12 of the flutes is remote from the diametrically disposed cutting edge 11. The flutes function to maintain this chisel edge in absolutely diametric position relative to the axis of the hole being drilled and at the same time their sharpened edges 14 act to shear down the side walls of the drilled hole.

The further improved result obtained by this type of drill is that it wears extremely slowly and after it has worn slightly, is readily sharpened without materially destroying the true diameter of the drill. In many of the standard drills, the cutting edges are radially disposed with no provision made for durability at those outer or circumferential cutting points which cut and maintain the diameter of the hole being drilled.

In the present case, the outer cutting edges are line edges as opposed to the points which customarily result from radially disposed cutting edges. These line cutting edges, due to their length, are more durable and greatly prolong the life of the drill.

In the case of cutting edges terminating in corners or points at the circumference of the drill, there is a tendency for these points to wear round so that the end of the drill defined by the points becomes rounded, causing the drill to wedge in the hole whereby it fails to advance and resharpening is necessitated. This resharpening reduces the diameter of the drill because it requires considerable grinding to eliminate the rounded outer corners or points of the cutting edges, it being understood that this type of drill is slightly larger at its operative end for the purpose of providing working or cutting discharge clearance in the back of the cutting edges.

In the present instance, due to the relatively long generally circumferentially disposed line edges, this result of improper wear is eliminated for if the line edge becomes dull it does not become rounded to any extent and less grinding away of the end of the drill is required. The result of this is that generally regarded the true diameter of the drill is maintained.

In addition to the above advantages of operation and wearing quality, the present drill possesses the advantage of an extremely simple sharpening operation. As shown in Figure 2 of the drawing, the angle of the intersection of the sides 13 of the chisel knife edge with the ends 13 of the web is subtantially a right angle. Therefore, and also in view of the fact that the side or shearing edges 14 of the webs are parallel to the main cutting edge 11, it is possible to sharpen the tool in two grinding operations, one at each side of the chisel edge, each of these grinding operations sufficing for grinding one side of the chisel edge and the adjacent side shearing edge.

Having described my invention, I claim:

1. A rock drill having its operating end defined by radial flutes, the ends of certain of said flutes terminating in a diametrically arranged line cutting edge, and the remaining flutes being disposed at right angles to the flutes defining said line cutting edge, the ends of said remaining flutes ground away clear of the line cutting edge and presenting cutting edges at their outer ends in parallelism with said line cutting edge.

2. A drill having a diametrically arranged line edge and circumferentially arranged edges, a portion of the drill end between said diametrically arranged line edge and said circumferentially arranged edges ground away wherein each surface extending from a respective circumferentially outer arranged edge to the adjacent side wall of the diametrically arranged line edge substantially defines a right angle, and wherein all edges are substantially in parallelism and grinding may be performed by applying the drill to the edge of the grinding wheel within the respective right angle portions at each side of the central cutting edge.

In witness whereof, I hereunto subscribe my name.

JOHN M. HARGRAVE.